United States Patent [19]

Pocholle et al.

[11] Patent Number: 5,077,750
[45] Date of Patent: Dec. 31, 1991

[54] POWER LASERS PUMPED BY LASER DIODES

[75] Inventors: Jean-Paul Pocholle, Arpajon/la Norville; Michel Papuchon, Massy, both of France

[73] Assignee: Thompson-CSF, Puteaux, France

[21] Appl. No.: 527,892

[22] Filed: May 24, 1990

[30] Foreign Application Priority Data

May 30, 1989 [FR] France .................. 89 07079

[51] Int. Cl.⁵ .......................................... H01S 3/081
[52] U.S. Cl. .................................. 372/68; 372/75; 372/97; 372/108; 372/93
[58] Field of Search .............. 372/97, 99, 68, 92, 372/75, 108, 93

[56] References Cited

U.S. PATENT DOCUMENTS

| | | | |
|---|---|---|---|
| 3,496,487 | 2/1970 | Soffer et al. | 372/68 |
| 3,753,145 | 8/1973 | Chesler . | |
| 4,025,172 | 5/1977 | Freiberg | 372/97 |
| 4,901,330 | 2/1990 | Wolfram et al. | 372/75 |

FOREIGN PATENT DOCUMENTS 1556589 12/1968 France .

OTHER PUBLICATIONS

Soviet Journal of Optical Technology, vol. 43, No. 1., Jan. 1976, New York, U.S.; L. N. Kaporskii et al.: "Optomechanical Apparatus for the Synchronization of Giant Pulse Lasers," pp. 61-62.
Patent Abstracts of Japan, vol. 5, No. 44, (E-50)[716], Mar. 24, 1981; & JP-A-55, 166 984 (Matsushita Denki Sangyo) 26-12-1980.
Applied Optics, vol. 26, No. 16, Aug. 15, 1987, pp. 3177-3179, K. Chan: "Multiple-Pass Laser-Diode-Pumped Nd: YAG Amplifier: Design".

Primary Examiner—William L. Sikes
Assistant Examiner—Susan S. Morse
Attorney, Agent, or Firm—Oblon, Spivak, McClelland, Maier & Neustadt

[57] ABSTRACT

Disclosed is a power laser in which several laser diodes emit pump beams towards amplifier media. The beams coming from these amplifier media are combined by an optical system to give a common beam transmitted to an output mirror. The mirror and a reflecting face of each amplifier forms an optical cavity.

13 Claims, 5 Drawing Sheets

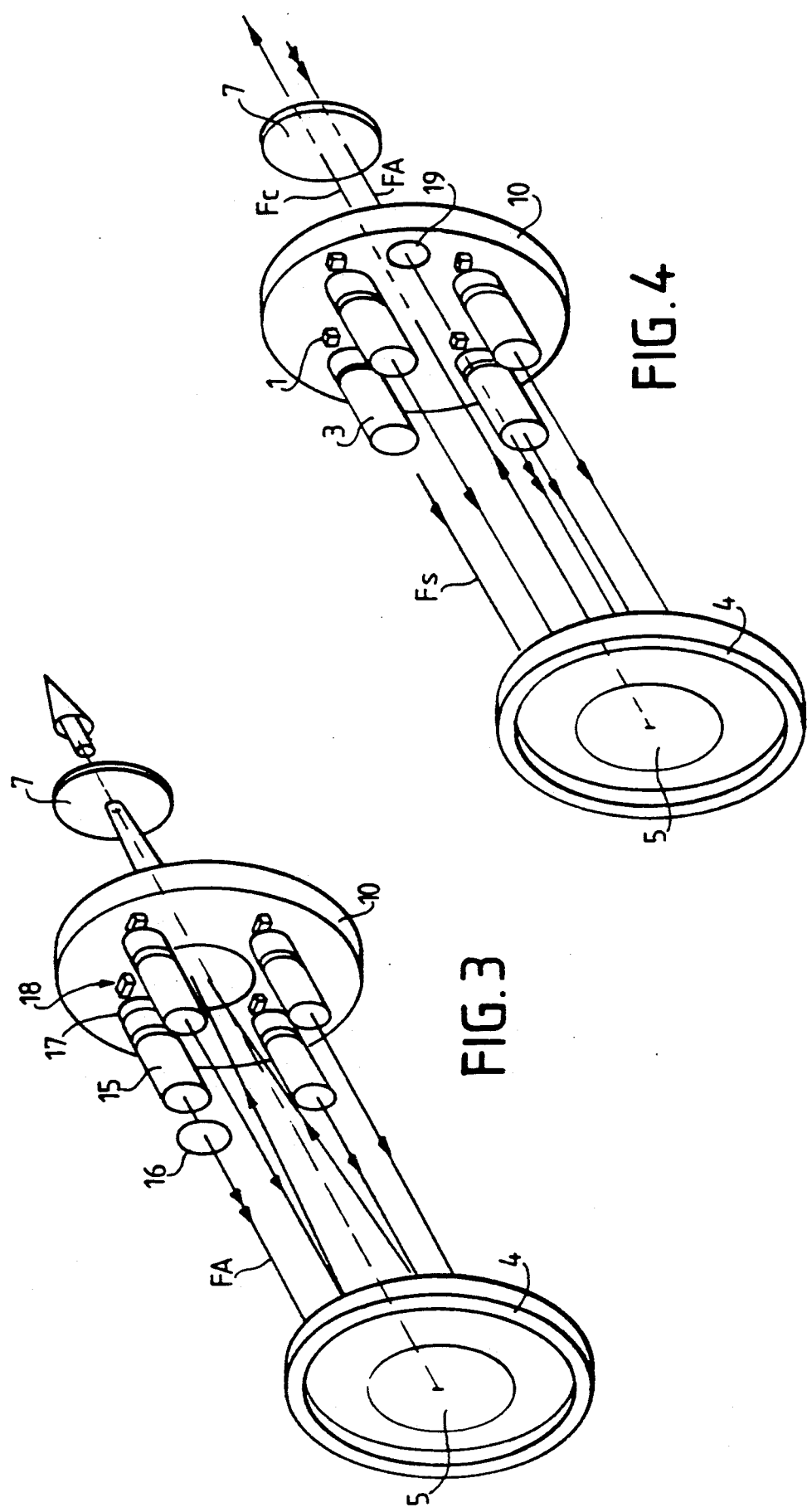

POWER LASERS PUMPED BY LASER DIODES

BACKGROUND OF THE INVENTION

1. Field of the Invention

The invention concerns power lasers pumped by laser diodes and, notably, a set of several power lasers pumped by laser diodes.

2. Description of the Prior Art

The emergence of laser diodes delivering high power and the adjustment of the transmission wavelength by a control of the composition of the epitaxiated layers or by using the properties of quantum well structures now makes it possible to envisage the making of coherent power sources using solid lasers with resonant pumping.

The use of this concept of pumping by laser diodes in order to make power lasers requires, conventionally, the use of transversally pumped slabs. Different approaches have been proposed. However, transversal pumping has some drawbacks:

the coupling between the linear arrays of laser diode and the slab is such that the heat exchanges at the slab are not easy;

the heat dissipation at the laser diodes requires the use of bulky radiators, and the control of these pump lasers dictates the use of electrical conductors having a certain mechanical rigidity (to cope with strong currents). These drawbacks mean that the number of laser linear arrays that can be used for the transversal pumping is reduced to the minimum;

the pumping efficiency cannot be optimized since the spatial distribution of the gain is the image of the distribution in intensity of the pump wave. The result of this is that the overlapping between the distribution of the mode in the cavity and that of the gain is close to that obtained by means of lamp or flash pumping (barring the spectral efficiency of pumping). However, we can see the advantage related to the use of a slab structure as compared with the slab with the property of having a higher distributed gain for an identical active medium since the optical path is obtained by a multiple total reflection (a zig-zag path).

One alternative consists in using sheets of optical fibers which, in being coupled to the pumping sources, make it possible, by off-settings, to dissociate the thermal problems at the pumping sources. However, this basic configuration has drawbacks related to fact that the coupling efficiency (input-output) in the fiber bundles is not 100% and that the distribution of the gain will always be less well adapted to the cavity mode as compared with that obtained by a longitudinal pumping.

The ultimate disturbing effects that could appear in the laser slab even in the presence of resonant pumping are also thermal.

In this case, the residual thermal effects are related to the quantum yield of the transfer which varies in the ratio ($w_1/w_p$: laser transition frequency/absorption frequency i.e. pump frequency) and mean, for example, that if it is desired to obtain 1 mJ at 1.064 $\mu$m from the transition $^4F_{3/2}$ $^4I_{9/2}$ of the $Nd_{3+}$ ion, inserted in the YAG matrix, the pump energy at 0.808 $\mu$m should be 1.3168 mJ. This pump wavelength characterizes the absorption band associated with the transition between the levels $^4I_{11/1}^4F_{5/2}$. In this case, the ratio $w_1/w_p$ is equal to 0.7594. This also means that 0.3168 mJ participates in the heating of the medium, this energy corresponding to the non-radiative transitions.

This observation is all the more important as the ratio $w_1/w_p$ is small. Thus, the use of pumping by diode lasers of the Tm3+ ion alone is expressed by a ratio $w_1/w_p=0.785/2.02=0.3886$. This means that, to obtain 1 mJ at 2.02 $\mu$m, it is necessary to use a pumping energy at 0.785 $\mu$m of 1.6536 mJ which is accompanied by the dissipation of 0.6336 mJ characterizing the non-radiative transitions. Conversely, the use of a $Tm^{3+}:Ho^{3+}$ codoping of the YAG makes it possible to obtain a ratio $W_1/w_p$ in taking account of effects, of the order of 0.74, of crossed relaxation oscillations and of transfer of the excited Tm3+ ion on Ho3.

These magnitudes show that the use of resonant pumping will have a limitation on the pumping efficiency laid down by the ratio $w_1/w_p$. And the ultimate residual thermal effects that could develop in the laser crystal will be governed by this ratio.

The field covered by the present invention concerns solid-state power lasers pumped by laser diodes.

The use of laser diodes for the pumping of solid lasers has contributed to the revival of these coherent sources with the advantages proper to resonant optical pumping, namely:

greater efficiency;

high rate of repetition;

reduction of stray thermal effects;

etc.

The demonstrations have reported essentially in using longitudinal pumping. This limits the power levels that could be obtained. For, the length of the slab or, more generally, the efficiently excited volume, is restricted by the absorption of the medium at the pump wavelength. For example, for Nd:YAG, this length is equal to 5 mm. The obtaining of a higher power level then requires a transversal pumping of a slab or of a plate with a radius or thickness suited to absorbing the power of the pump.

Although the pump is resonant, a part of the power absorbed is, however, converted (through the excitation of the non-radiative transitions) into heat. Furthermore, the level of power required to pump and make a power laser dictates the use of a system for the removal of calories at the power laser diodes (it may be recalled that the efficiency of optical/electrical conversion in a laser diode is typically between 40% and 50%). There then arises the problem of designing a power laser head pumped by laser diodes, taking these problems into account.

The object of the present invention is based on the implementation of a new type of architecture of the pumping mode and cavity in order to make a power laser pumped by laser diodes reducing the residual thermal effects of the active medium to the minimum. It relies on the use of a longitudinal pumping of several laser slabs by laser diodes.

SUMMARY OF THE INVENTION

The invention therefore concerns power lasers pumped by laser diodes, said power lasers comprising:

at least two laser diodes (1, 1') emitting a pump beam (Fp);

at least two amplifier media (3, 3') each coupled to a laser diode (1, 1') and each having an input face receiving the pump beam emitted by the associated laser diode (1, 1') and retransmitting an output beam (Fs, Fs') by an output face (31);

an optical coupling system (4, 40', 5) receiving the output beams (Fs, Fs') emitted by the amplifier media (3, 3') and retransmitting them as a common beam (Fc);

an output mirror placed on the path of the common beam (Fc);

each input face (30) being made so as to transmit the pump beam (Fp) received from a laser diode (1, 1') and so as to reflect the output beam (Fs, Fs') from the amplifier medium, the different input faces thus forming an optical cavity along with the output mirror.

The invention also concerns a power laser wherein the two laser diodes and the amplifier media are located symmetrically with respect to an axis (XX') and wherein the optical coupling system comprises, associated with each amplifier medium, first mirrors inclined with respect to the direction of the output beam (Fs, Fs') from the amplifier medium and located symmetrically with respect to the axis (XX') as well as second mirrors, also located symmetrically with respect to the axis (XX') receiving the outputs beams (Fs, Fs') reflected by the first mirrors and reflecting them substantially along the axis (XX'), said output mirror being aligned along this axis (XX').

More precisely, the invention concerns a power laser comprising a plurality of laser diodes and amplifier media arranged along the generatrices of an imaginary cylinder with an axis (XX), and wherein the optical coupling system includes a first reflecting device comprising a reflecting conical ring having, as its axis, the axis (XX') of the cylinder and reflecting the output beams from the different amplifier media towards the axis (XX') of the cylinder, as well as a second reflecting device including a reflecting conical surface positioned along the axis (XX') of the cylinder and reflecting the output beams along the axis (XX') of the cylinder, said output mirror being aligned along this axis (XX').

BRIEF DESCRIPTION OF THE DRAWINGS

The different objects and characteristics of the invention will appear more clearly from the following description, given by way of example with reference to the appended figures, of which:

FIGS. 3 and 4 show a variant of the power laser according to the invention, comprising a means of servo-control by a control beam;

DETAILED DESCRIPTION OF THE INVENTION

Figure 1:
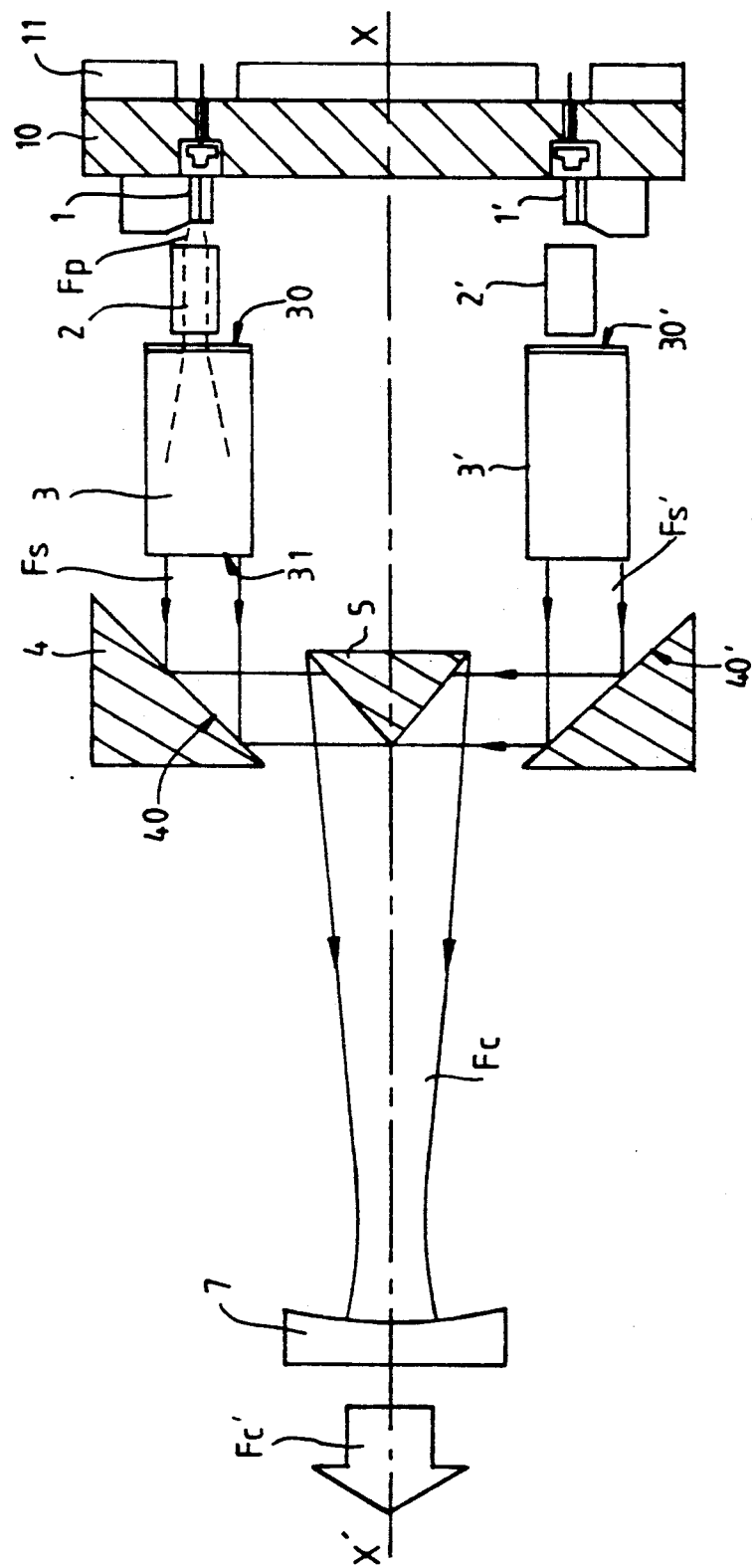
FIG. 1 shows a first exemplary embodiment of the power laser according to the invention.

Referring to FIG. 1, we shall therefore describe an exemplary embodiment of the device of the invention.

On a base 10, there are mounted laser diodes 1 and 1' symmetrical with respect to an axis XX'. In FIG. 1, the device has been shown in a section and only the two laser diodes 1, 1', located in the plane of the section, have been represented. However, the device may include, on the base 1, a set of laser diodes arranged according to a circle with axis XX'. The base may then advantageously have the shape of a circle. It has, on one of its faces and, for example, on the face that does not have the laser diodes, cooling radiators 11. The base 10 therefore permits:

the mechanical holding of the diodes;
the distribution of the supply current;
heat exchange by means of radiators distributed on the opposite surface;
housings that enable the insertion of the photodetectors for controlling the power delivered by each of the laser diodes.

Each laser diode may be an association of stacked linear arrays or strips made up of a large number of laser diodes.

Each laser diode emits a pump beam $F_P$ with a determined pump wavelength, each of which longitudinally pumps an amplifier such as a laser slab 3, 3' by means of a matching optical device 2, 2' of the anamorphosing type.

Each laser slab has a surface 30, 30' treated mechanically (to give it a radius of curvature) and optically (with multidielectrical layers) so as to have a maximum coefficient of reflection at the laser wavelength and a minimum coefficient of reflection at the pump wavelength proper to the rare earth ion used. The length of each slab is adapted to the coefficient of absorption, to the pump wavelength and to the rate of doping in weight. The length of each crystal is of the order of 5 mm. The other face of the slab may be treated to be anti-reflective at the laser wavelength and/or put into a state such as to have an angle of incidence according to Brewster's law by polishing in order to make a selection of a polarization state on the laser wave.

The use of multiple slabs makes it possible to distribute the thermal effects and to increase the surfaces of exchange with the surrounding environment.

In each laser slab 3, 3' a pump beam Fp gives rise to a beam Fs, Fs' transmitted to an optical system 4, 4', 5.

Each beam Fs, Fs' is incident on the optical system which works in reflections and enables each elementary system to be coupled to a common output mirror 7.

More precisely, this optical system includes reflection devices 40, 40' reflecting the beams Fs and Fs' towards the axis XX' and a reflection device 5 reflecting these beams along the direction of the axis XX' towards a mirror 7 which, with the treated surfaces 30, 30' of the slabs 3, 3', then forms an optical cavity.

In the case of laser diodes 1, 1' and slabs 3, 3' arranged in the form of a cylinder generated by revolution on an axis XX', the reflection devices 40, 40' are formed by a ring-shaped diopter with axis XX' offering a conical reflecting surface to the beams such as Fs, Fs'. In this case, the reflection device 5 is a conical diopter with axis XX' located on this axis to receive the beams Fs, Fs' and retransmit them in the form of a beam Fc, along the axis XX', towards the mirror 7. In FIG. 1, the device 5 is oriented so that the beam Fc goes out of the device.

Figure 2:
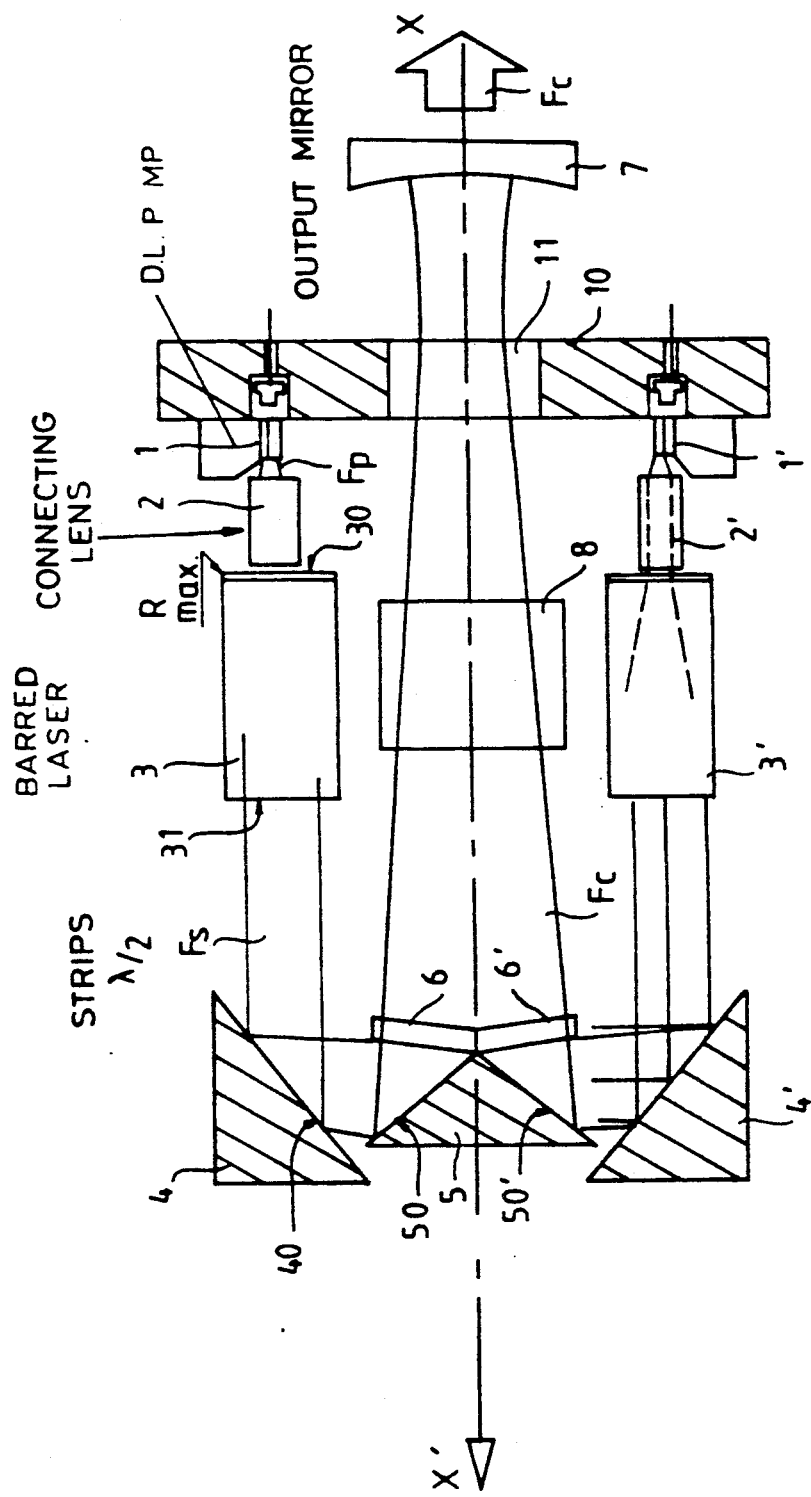
FIG. 2 shows a second exemplary embodiment of the power laser according to the invention.

In FIG. 2, by contrast, the reflection device 5 is oriented so that the beam Fc penetrates the device. The base 10 is then provided with a hole 11 enabling the beam Fc go out of the device. In other words, if the beam Fp is oriented in the direction of the axis XX', the beam is sent by the reflection device 5 in the reverse direction to that of the axis XX': this forms a structure in folded mode.

A set of half-wave strips 6, 6' enables the state of polarization of each elementary beam to be adjusted so that all of this beam is in the adapted polarization state for the use of an electro-optical system to control the opening of the cavity by means of the Q-switch 8.

The configuration of the structure of FIG. 2 enables the cavity length to be modified by translation of the optical assembly 4, 4', 5. This enables adjusting the width of laser pulses generated through operation in Q-switch mode. In this case, the lifetime of the photon in the cavity is modified.

The making of a power laser requires the insertion of a system for blocking the cavity in order to obtain a high population inversion. The electro-optical effect makes it possible to control the opening of the cavity and thus to obtain a very high-level stimulated emission. Should it be desired to carry out or to benefit from an effect of phasing of the elementary sources, the conditions on the state of polarization of the beams calls for the use of half-wave strips as mentioned previously and of a common modulator which can be positioned instead of the Q-switch 8.

For a more conventional configuration, each elementary laser may be controlled individually by inserting an electro-optical modulator, not shown, on each channel.

In this case, it is not necessary to insert halve-wave strips in the cavity.

It may be recalled that obtaining high peak power calls for a very high population inversion and a very low leakage at the system for blocking the cavity. The fact of distributing the control elements and the pumping (or amplifier medium with gain) enables these parameters to be controlled.

The phasing of the different lasers can be done through a reflection on the output mirror 7 or a stray reflection on the electro-optical modulator (although this modulator is given anti-reflection treatment).

FIGS. 3 and 4 show devices according to the invention wherein there is provision for a servo-control beam FA used for the control for the phasing.

The device of FIG. 3 provides for an external control (feeding) source put in the place of one of the components forming one of the arms of the laser and comprising a master laser 15 included in a cavity defined by two mirrors 16 and 17 and pumped by a laser diode 18.

FIG. 4 shows a device in which a control beam FA given by external means (not shown) is injected into the device by an aperture 19 made in the base 10 instead of a laser diode. The beam FA then takes the place of one of the channels of the device.

Figure 5:
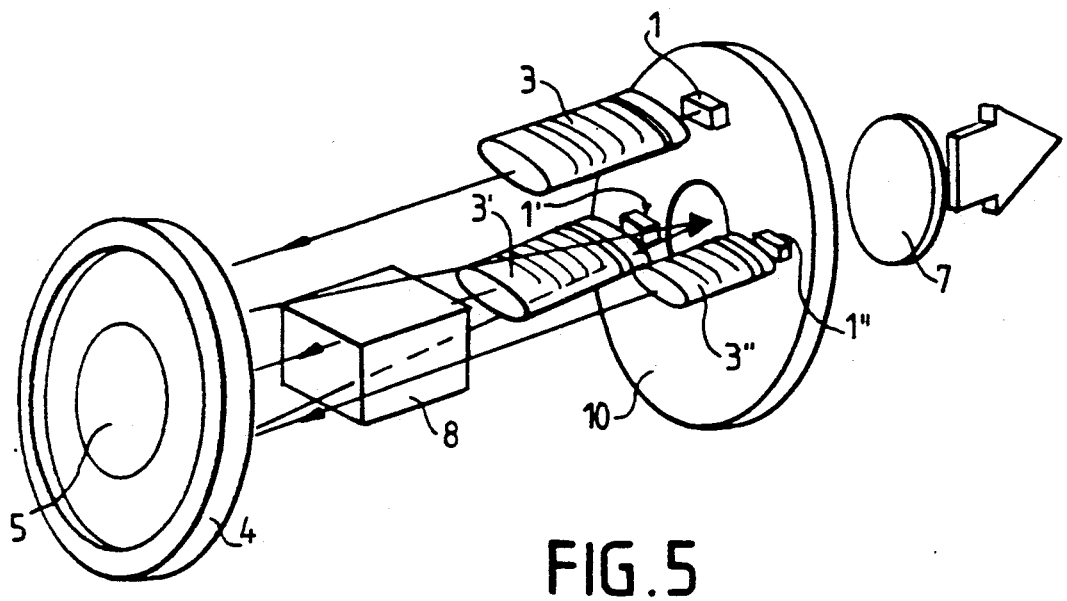
FIG. 5 shows a variant of the power laser according to the invention, enabling the emission of a multi-spectral beam.

This barrel-shaped design of the laser enables the making of multi-spectral sources FIG. 5 provides, for example, for the use of the following materials for the amplifier media 3, 3' and 3":
for the medium 3: an Nd:YAG laser material pumped at a wavelength of 0.808 µm and emitting at the wavelength of 1.064 µm;
for the medium 3': a Tm:Ho:YAG laser material pumped at a wavelength of 0.785 µm and emitting at the wavelength of 2.02 µm;
for the medium 3": an E:iYLF laser material pumped at a wavelength of 0.797 µm and emitting at a wavelength of 2.8 µm.

The beams coming from these media are coupled to one another by the optical system 4, 5. In this case, the output mirror 7 should offer a maximum reflectivity at these three wavelengths.

Figure 6:
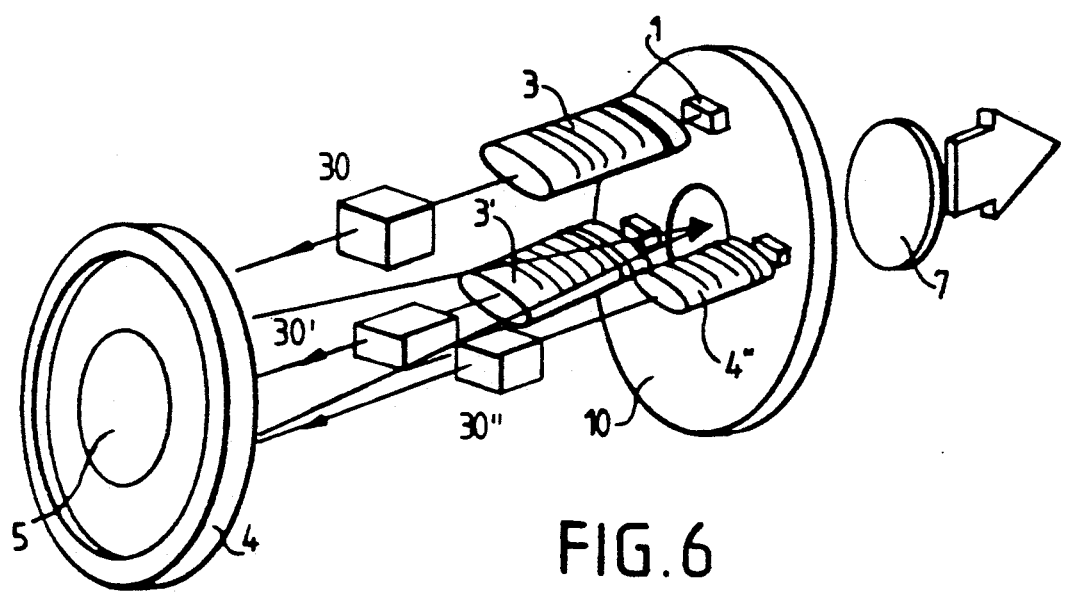
FIG. 6 shows another variant of the power laser of the invention providing for frequency doublers.

FIG. 6 shows another design of the structure of the invention. According to this design, there is provision for frequency doublers 30, 30', 30" in series with the amplifier media 3, 3', 3".

The amplifier media 3, 3', 3" are Nd:YAG lasers.

These are Nd:Yag lasers with pumping by laser diodes and cavities tuned to the 0.946 µm, 1.064 µm and 1.318 µm wavelengths (FIG. 3b). For, these laser transitions can be obtained through a pumping centered on 0.808 µm. In the presence of a frequency doubler crystal enabling the generation of a harmonic wave for each of the lines of the laser emission, it is possible to set up a white source. For, to each of the emission lines, there correspond harmonic waves respectively located in the blue (0.473 µm), the green (0.532 µm) and the red (0.651 µm).

Figure 7:
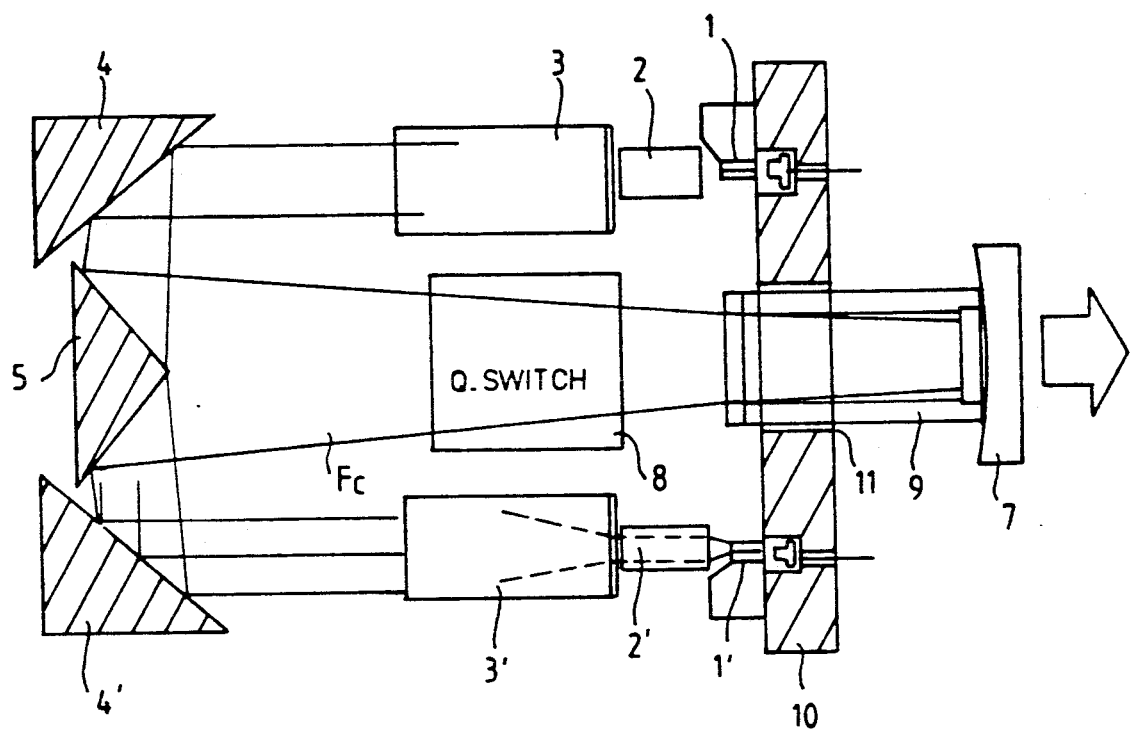
FIG. 7 shows another variant of the power laser of the invention providing for a Raman cell on the output beam.

FIG. 7 represents an alternative embodiment according to the invention in which there is provision for a RAMAN type pressurized gas cell 9 which, placed in the path of the common beam Fc, is pumped by it. This RAMAN cell 9 enables a frequency conversion to be made. For example, in one embodiment of an Nd:YAG power laser working in triggered mode (Q-switch), the insertion of a RAMAN cell makes it possible to obtain a compact system capable of being pumped by laser diodes and working at 1.06 µm or at 1.63 µm and also making it possible to give both wavelengths.

The use of a RAMAN cell in the cavity makes it possible to take advantage of the high intra-cavity power density to obtain an efficient transfer of frequency from the pump wavelength centered, for example, at 1.064 µm to the Stokes wavelength of methane at 1.53 µm. It is enough to remove the methane or to reduce the pressure of this gas in the cell to obtain a source working at 1.064 µm.

The invention thus described therefore concerns a laser structure architecture providing for a distribution of the amplifier medium and a grouping of the pumping laser diodes on one and the same surface.

The advantages of such a configuration are that it provides for:
distributing the residual thermal effects at the different amplifier media;
presenting a greater surface of heat exchange between the laser crystal and the surrounding environment;
grouping the pump laser diodes on one and the same base, thus simplifying the design of the system for removing calories;
enabling the making of a compact laser by a folding of the cavity;
optimizing the efficiency of conversion by using a longitudinal pumping that enables efficient overlapping to be preserved between the mode of the cavity (identical for each of the channels) and the spatial distribution of the gain in the laser slab (image of the distribution of the pump);
enabling the phasing of the N arms of the laser system (it may be recalled that, in a perfect case, the result is an addition of the fields, and the intensity increases as $N^2$);
enabling the insertion, on each of the channels, of a frequency doubler component or of a laser with a different emission frequency (multi-spectral source);

enabling the control of the oscillator set by a "master" source internal or external to the system;

making a source that can work in two wavelengths by integrating a RAMAN cell into the laser;

using the concept of strip laser diodes to achieve the pumping and to distribute it;

Finally, another advantage is that it is possible to conceive of the making of a multi-spectral power source by the insertion, in the barrel-type structure, of different crystals and rare earth ions pumped from spectrally adapted laser diodes, and by making an output mirror with a coefficient of reflection adjusted to the different wavelengths of emission.

The fields of application are those associated with the use:

of power lasers pumped by laser diodes and covering the spectral regions ranging from the visible to the near IR (0.5 to 3 μm) in integrating intra-cavity frequency doubling operations;

the processing of laser beams and their control by using phasing concepts;

spatially and spectrally coherent sources with the aim of using them to carry out frequency mixing operations in non-linear media (tunable sources)

It is quite clear that the foregoing description has been made purely by way of an example.

Other variants may be contemplated without going beyond the scope of the invention. The numerical examples and the examples of materials have been given only to illustrate the invention.

What is claimed is:

1. A power laser pumped by laser diodes, said power laser comprising:

at least two laser diodes emitting a pump beam;
    at least two amplifier media each coupled to a laser diode and each having an input face receiving the pump beam emitted by the associated laser diode and retransmitting an output beam by an output face;
    an optical coupling system receiving the output beams emitted by the amplifier media and retransmitting them as a common beam;
    an output mirror placed on the path of the common beam;
    each input face being made so as to transmit the pump beam received from a laser diode and so as to reflect the output beam from the amplifier medium, the different input faces thus forming an optical cavity along with the output mirror.

2. A power laser according to claim 1, wherein the two laser diodes and the amplifier media are located symmetrically with respect to an axis and wherein the optical coupling system comprises, associated with each amplifier medium, first mirrors inclined with respect to the direction of the output beam from the amplifier medium and located symmetrically with respect to the axis as well as second mirrors, also located symmetrically with respect to the axis receiving the outputs beams reflected by the first mirrors and reflecting them substantially along the axis, said output mirror being aligned along this axis.

3. A power laser comprising a plurality of laser diodes and amplifier media arranged along the generatrices of an imaginary cylinder with an axis, and an optical coupling system including a first reflecting device comprising a reflecting conical ring having, as an axis thereof, the axis of the cylinder and reflecting the output beams from the different amplifier media towards the axis of the cylinder, as well as a second reflecting device including a reflecting conical surface positioned along the axis of the cylinder and reflecting the output beams along the axis of the cylinder, said output mirror being aligned along this axis.

4. A power laser according to claim 3 wherein the laser diodes are positioned by a support so that a pump wave of each laser diode is propagated in a first direction extending along the axis of the cylinder and the second reflecting device is oriented in such a way that the beam going out of the optical cavity for the output mirror is propagated in the first direction.

5. A power laser according to claim 3 wherein the laser diodes are positioned by a support so that a pump wave of each laser diode is propagated in a first direction extending along the axis of the cylinder and the second reflecting device is oriented in such a way that the beam coming out of the optical cavity through the output mirror is propagated in a direction reverse to the first direction.

6. A power laser according to claim 1, wherein the laser diodes are mounted on one and the same metallic base providing for the mechanical holding of the diodes, the distribution of the supply current to the diodes and the heat exchange by means of radiators mounted on one face of the metal base.

7. A power laser according to claim 1, including half-wave strips inserted in the cavity.

8. A power laser according to claim 1, including a Q-switch type switch inserted in the common beam.

9. A power laser according to claim 3, including a control beam placed along a generatrix of the cylinder and oriented in the same direction as the beams emitted by the laser diodes.

10. A power laser according to claim 3 including, instead of any one of the amplifiers, a master laser emitting a control beam.

11. A power laser according to claim 3, including a frequency doubler on the path of each output beam and in the vicinity of each amplifier medium.

12. A power laser according to claim 1, wherein the different amplifier media are made of materials having different natures.

13. A power laser according to claim 1, including, in the optical cavity, on the path of the common beam, a RAMAN type gas cell under pressure.

* * * * *